Sept. 24, 1940. S. L. C. COLEMAN 2,215,751
SPRING SUSPENSION
Filed Oct. 27, 1937 7 Sheets-Sheet 1

Inventor
Stephen L. Coleman
By
Attorney

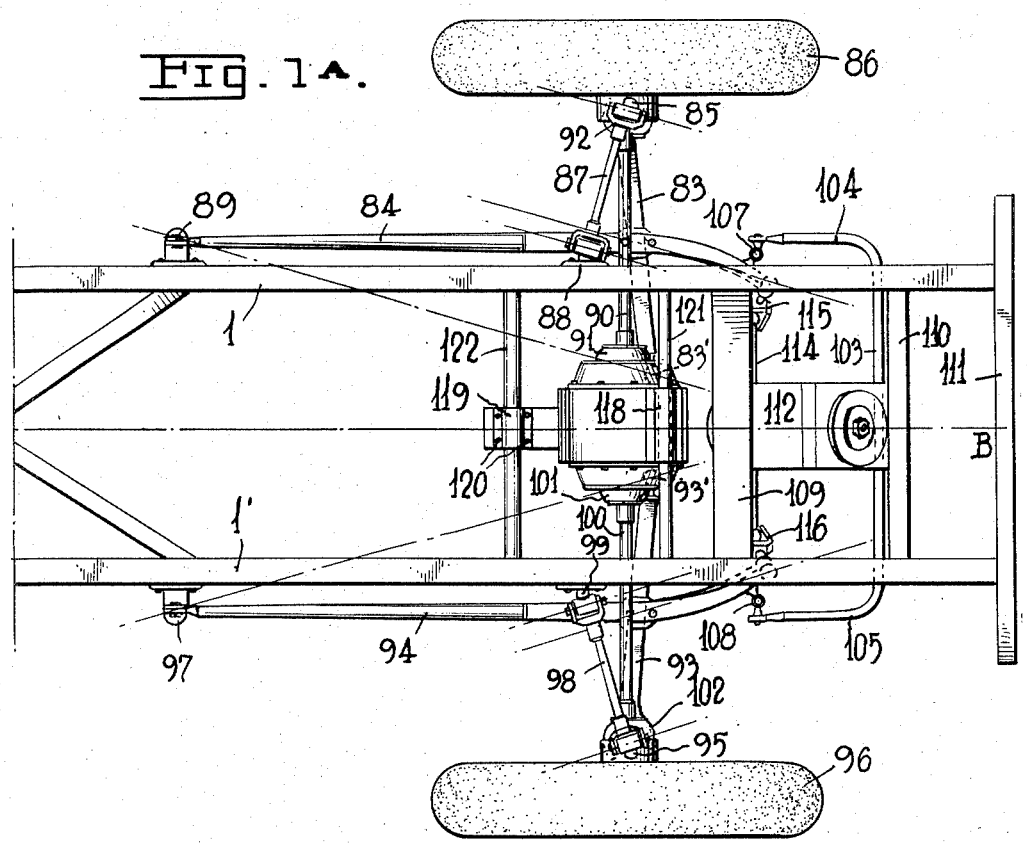
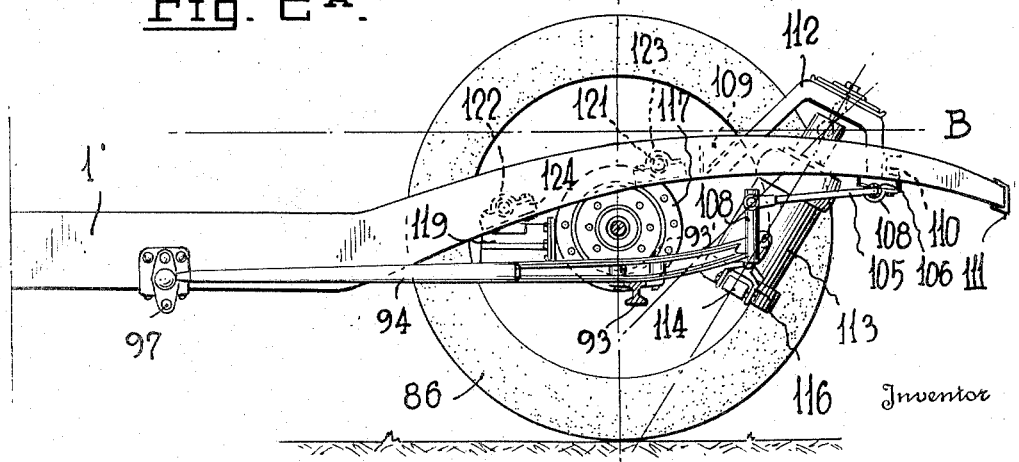

Sept. 24, 1940.  S. L. C. COLEMAN  2,215,751
SPRING SUSPENSION
Filed Oct. 27, 1937  7 Sheets-Sheet 3

Inventor
Stephen L. Coleman,
By T. Clyde Graist,
Attorney

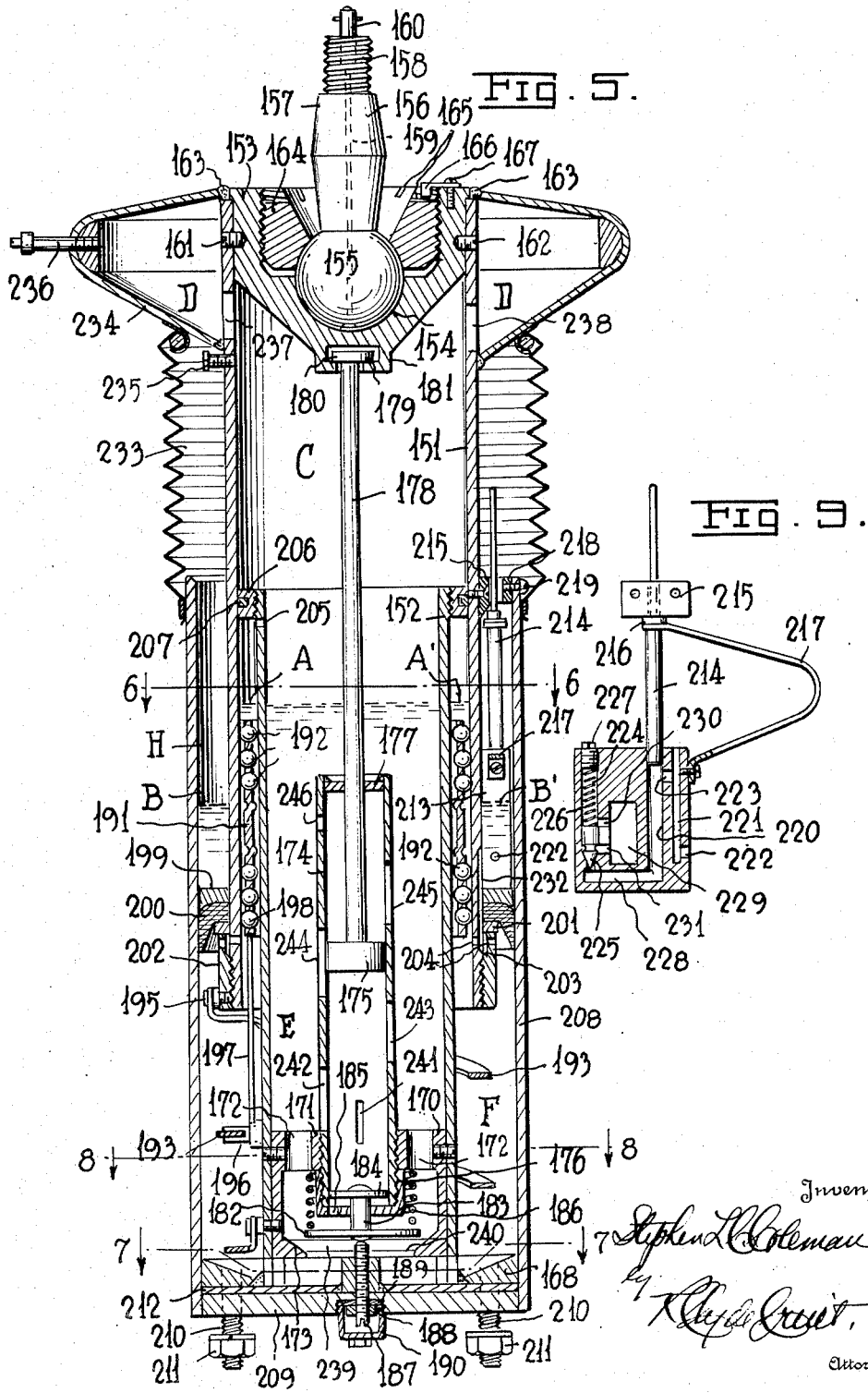

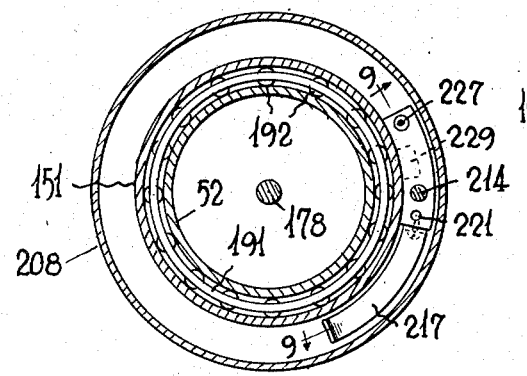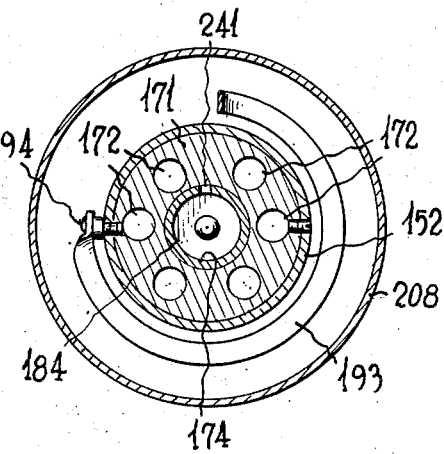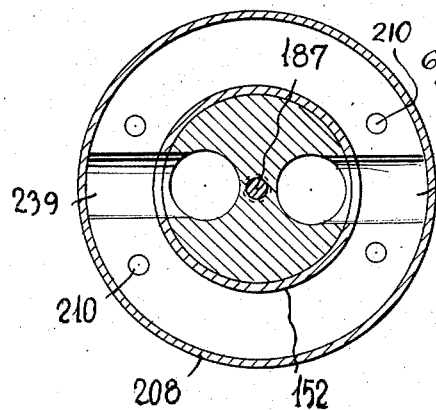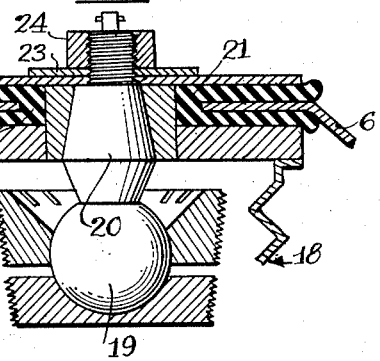

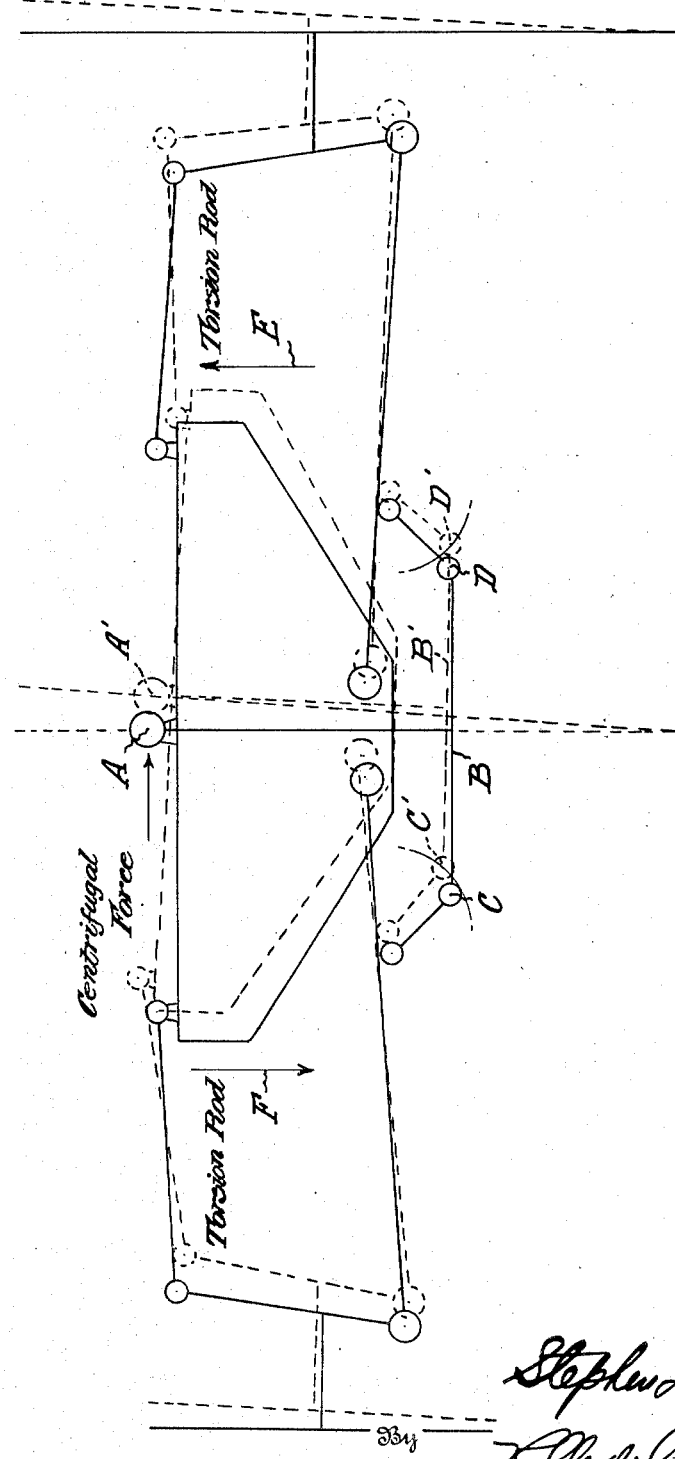

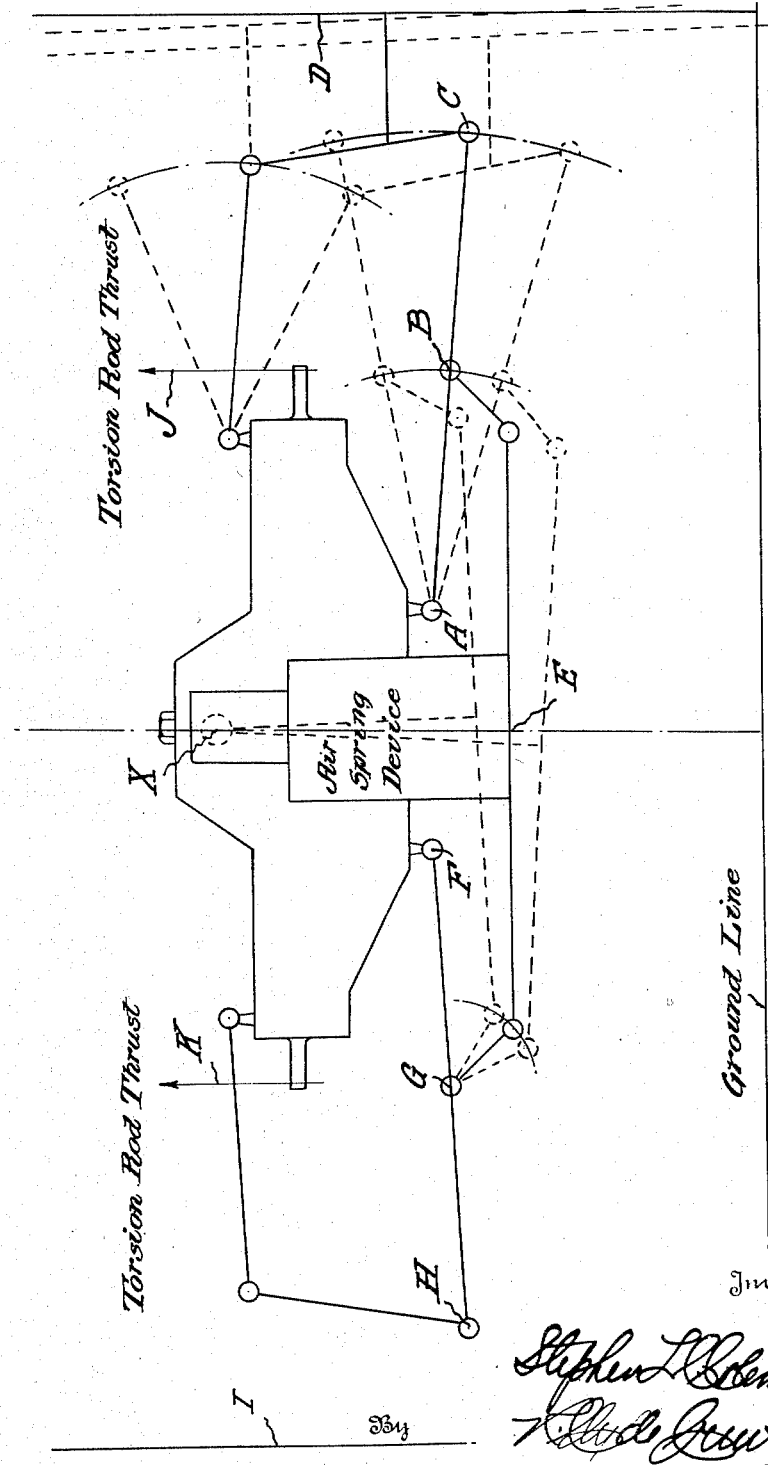

Patented Sept. 24, 1940

2,215,751

UNITED STATES PATENT OFFICE 2,215,751

SPRING SUSPENSION

Stephen L. C. Coleman, Fredericton, New Brunswick, Canada

Application October 27, 1937, Serial No. 171,377

6 Claims. (Cl. 280—124)

This invention relates to certain improvements in vehicle chassis construction and particularly to an improved and novel spring suspension for motor vehicles of the type as broadly covered in applicant's Reissue Patent Number 18,177 and as further disclosed in applicant's later issued Patents Numbers 2,084,320, 2,085,006 and 2,085,738.

The object of this invention is to provide a combination of elements and devices in a running gear, whereby the brake torque reactions will be transmitted to the frame in such a direction and manner as to prevent forward and rearward pitching of the chassis and also any tendency of the rear end of the frame to rise when the speed of the vehicle is suddenly accelerated.

Another object of this invention is to improve and simplify the method and manner of mounting the torsion stabilizers whereby their effectiveness against rolling is greatly increased without offering any resistance to one wheel rise.

A further object is the production of a vehicle suspension which will increase the self levelling effect, through the widening of the space between the inner ends of the torque arms and the longitudinal center line of the chassis.

A still further object of the invention is to incorporate in the suspension a fluid pressure spring and to mount and connect said fluid pressure spring so as to reduce the stroke of said spring device to one half of the wheel stroke at both ends of the vehicle.

Another object of this invention is to provide a vehicle suspension which will give much greater flexibility under one wheel action and at the same time eliminate heavy twisting strains in the frame and body.

It is a further object of the invention to provide independently sprung wheels, both front and rear, with parallelogram action including fluid pressure spring suspension units giving extreme softness on the first part of the spring stroke and requiring only two of such units.

Other advantageous features will be noted in the great increase in both flexibility and stability and the securing of a high plane of suspension.

Generally stated, the improved spring suspension comprises front and rear fluid pressure spring devices, each mounted on the center of a light rigid T sectioned equalizing member placed transversely of the vehicle frame, the outer ends of said equalizing members being flexibly connected to the overhanging outer ends of the torque arms of the running gear, by combination shackle, and ball and socket joints.

In the construction as illustrated, each fluid pressure spring or the like, comprises telescoping sections, the bottom section being fixed to the center of the equalizing members by studs while the top telescoping section is connected by a ball and socket joint to the frame at its longitudinal center line. Each spring device is preferably arranged at an angle to the vertical plane in such a manner that the angle increases under spring stroke.

These fluid pressure spring devices are used in conjunction with, and form a part of, both the front and rear spring suspension mounted at opposite ends of the vehicle frame and said suspensions are substantially identical.

The frame of the chassis comprises parallel side rails placed comparatively close together permitting short cross members and resulting in increased stiffness in the frame per se and a reduction in the weight thereof.

In combination with the each fluid pressure spring device, is a spring steel torsion rod arranged transversely of the frame, one near the front end and the other near the rear end of the vehicle. These torsion rods are rotatably mounted in bearings carried by the side rails of the frame and beyond the bearings said rods are bent inwardly to provide relatively long lever arms, the respective ends of said lever arms being flexibly connected to the outer overhanging adjacent ends of their respective torque arms.

The running gear at both the front and rear ends of the car is a type known as "the parallelogram," formed of parallel arms hinged to the car frame and pivotally connected and spaced apart at their outer ends by a substantially vertically disposed member adjacent each wheel. Each vertically disposed member is provided with an extending boss or the like by means of which the respective wheels are rotatably mounted and at the lower end of each of said vertically disposed members is a pivotal pin joint having a relatively long bearing to properly transmit the braking torque to the inner ends of the respective torque arms. The joint at the upper end of each vertical member may be either a ball joint or a rubber bushed pin joint so as not to interfere with the necessary transmission of the brake torque to the torque arm. The proper ratio of length of the upper arm of the parallelogram with respect to the length of the lower lever arm, governs the up and down path of travel of the wheels and if desired, a constant tread width can be secured, in a manner to be hereinafter described.

The casing for the differential is supported upon two parallel tubes extending transversely of the vehicle frame. These tubes at their intermediate portions are rigidly secured to the differential casing and extend to the side rails of the main frame where the ends of said tubes are mounted in rubber insulated bearings.

The fluid pressure spring devices are of particular design and comprise in themselves in addition, hydraulic shock absorbers and rebound cheeks, the construction of which to be hereinafter more fully described.

The steering mechanism is of the divided type including the necessary steering linkage in combination with a transversely slidable carriage giving perfect control.

The preferred embodiment of the invention as illustrated in the accompanying drawings in which Figures 1 and 1A are a plan view of the complete assembly, Figures 2 and 2A are a side elevation thereof partly in section, Figure 3 is an end view in elevation of the front end of the improved suspension, Figure 4 is a detail view illustrating in elevation, one side of the rear parallelogram, Figure 5 is an enlarged detail view illustrating the internal construction of the fluid pressure spring device, Figure 6 is a sectional view on line 6—6 of Figure 5, Figure 7 is a sectional view on line 7—7 of Figure 5, Figure 8 is a sectional view on line 8—8 of Figure 5, Figure 9 is a view partly in section and partly in elevation of the fluid pump positioned on the right hand side of the main device as shown in Figures 5 and 6.

Figure 10 is a diagrammatic view illustrating the effect of the parallelogram mounting of the road wheels, Figure 11 is a diagrammatic view illustrating the theory of stability of the vehicle obtained by the improved suspension, and Figure 12 is another diagrammatic view illustrating the theory of increased flexibility also obtained by this novel arrangement.

Figure 13 is a fragmentary detail view illustrating the manner of securing the upper end of each of the spring devices to the frame.

Figure 1:
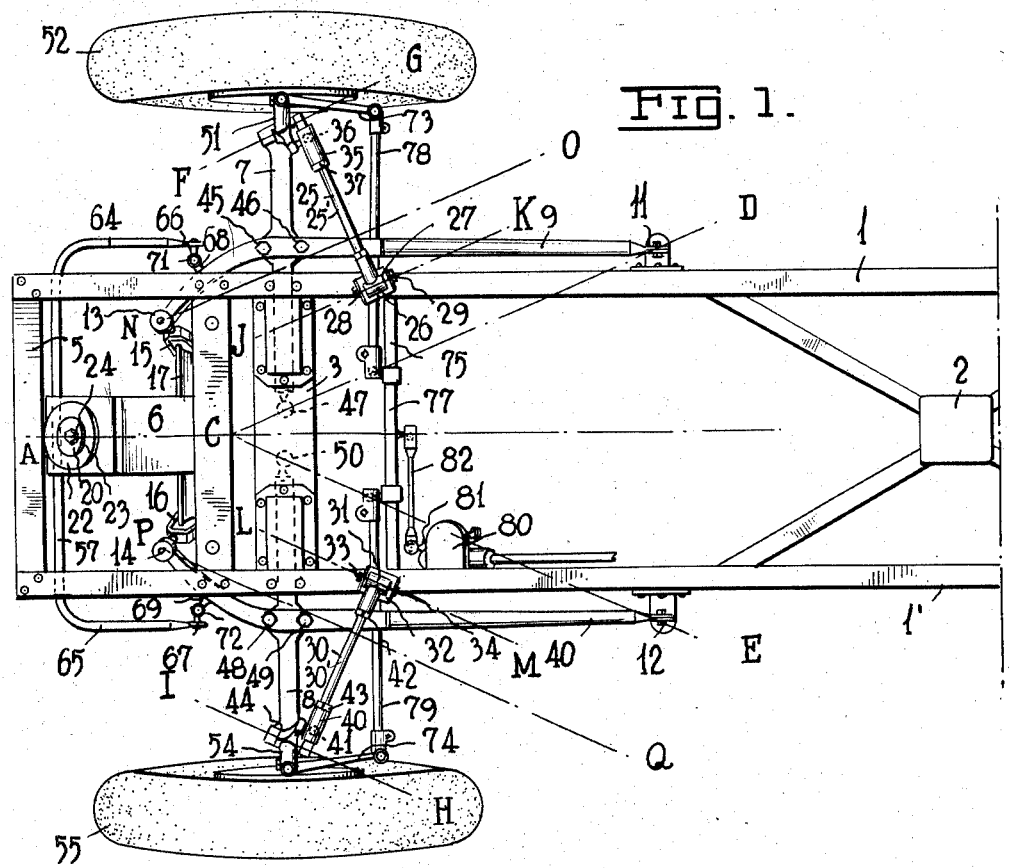

Referring to the drawings in detail, the present invention comprises a frame consisting preferably of two inwardly facing U shaped channels or side frame members 1 and 1', arranged parallel to each other and having a kick up over the front and rear axles as in accepted practice.

At their intermediate portions the side frame members 1 and 1' are tied together and braced by an X shaped cross member 2 the ends of said cross member being welded or otherwise secured to the side frame members. The X shaped member 2 is provided with a central opening to accommodate the drive shaft, (not shown).

Near the forward ends of the side frame members 1 and 1', at a point adjacent the mounting for the front axle, is a cross member 3 said member being secured to the side frame members and dipping down deeply below the said side frame members to permit the front end of the motor (not shown) to be mounted on top of it.

Just forward of the cross member 3 and in a plane above said member is another cross member 4, having its ends secured to the upper flanges of the side frame members 1 and 1' and providing a seat for the radiator core (not shown) of the vehicle. This cross member 4 has an inclined flange extending downwardly to engage the cross member 3 to which it is secured and the extreme forward ends of said side frame members are connected by a cross member 5, said parts being securely riveted together.

Secured to the intermediate portions of the cross members 4 and 5 is an arched or hood shaped member 6 for the purpose to be hereinafter described.

The axle sections 7 and 8 comprise the divided front axle for the vehicle and the inner ends of said axle sections are mounted for universal movements, in bearings carried by the cross member 3.

Extending across the intermediate portions of the axle sections 7 and 8 are torque arms 9 and 10 respectively, said torque arms being securely bolted to their respective axle sections. The inner end of each of the torque arms 9 and 10 terminates in a ball, said balls adapted to be retained in socket casings 11 and 12 secured to the outside of the side frame members 1 and 1' respectively. Each socket casing 11 and 12 has a demountable cap piece bolted to the main body of the casing for retaining the ball of the torque arm in place, and each ball joint is preferably rubber bushed.

The outer ends of these torque arms 9 and 10 extend considerably beyond their respective axle sections 7 and 8 and are curved inwardly toward each other for the purpose to be hereinafter explained. These outer ends are provided with cylindrical bosses 13 and 14 having formed thereon spherical seats to receive balls formed in the upper ends of shackles 15 and 16 for flexibly supporting an equalizer bar 17 the opposite ends of said equalizer bar being pivotally connected to said shackles by a pivot pin or bolt 27.

Securely mounted on the equalizer bar 17, at its intermediate portion, is a fluid pressure spring device 18 and the upper end of said spring device is flexibly connected to the arched or hood shaped member 6 by a ball 19 seated in a socket formed in the top of said spring device (see Fig. 13), said ball being provided with an integrally formed shank 20 projecting through an opening in the member 6, said connection being insulated by a rubber pad 21 surmounted by a steel disk 22 and a steel washer 23, and the whole assembly is drawn tightly together by a nut or the like 24 threaded on the outer end of the shank 20. The hole in member 6 is considerably larger than the shank 20 and this intervening space being filled with rubber there is no metal to metal contact between the air spring and the frame.

The particular construction of the fluid pressure spring device and the manner of connecting the same to the vehicle frame will be later described in detail.

Referring particularly to the left hand of Figure 3 and the front wheel assembly illustrated in Figure 1, the top lever arm 25, of the parallelogram of the running gear, is provided at its inner end with a hollow cylindrical boss 26 into which is tightly pressed a rubber bushing of a well known type, said boss 26 being pivotally secured by a bracket 27 fastened to the upper face of the side frame member 1, the steel tube in the center of the rubber bushing neatly fitting between the vertical ears of said bracket and the assembled joint being held tightly together by a bolt 28 passing through the holes in the ears of the bracket 27 and through the tube within the rubber bushing. When properly tensioned the tube within the rubber bushing is prevented from turning the nut 29 threaded into the protruding bolt 28. With this construction and arrangement the lever arm 25 is free to swing up and down in this rubber bushed pin joint and at the same time will be permitted limited movements sideways.

The connection of the lever arm 30 on the opposite side of the frame is exactly the same and the result identical. This lever arm 30 is provided with a hollow cylindrical boss 31 also enclosing a similar type of rubber bushing, said parts being mounted in a bracket 32 carried by the side frame member 1', upon a pivot bolt 33 provided with a clamping nut 34.

Referring again to the lever arm 25, the outer end of said lever is also provided with a hollow cylindrical section 35, but in this instance the cylinder is in line with said lever arm 25 and forms substantially a continuation thereof. Positioned within the cylinder 35 is a two piece bearing forming a spherical bearing or socket to receive a ball 36 said bearing being adjusted to a proper fit by a plug 36' threaded into the outer end of said cylinder 35. This is the usual construction employed in standard practice in automobile steering rod connections and it is thought unnecessary to illustrate the same in detail. The end pieces 26 and 35 of the lever arm 25 are connected together by a tube 25'. This tube 25' is threaded into the opposite end pieces 26 and 35 with right and left hand threads respectively so that by turning the tube 25' in the proper direction the lever arm 25 can be either lengthened or shortened as desired. When the proper adjustment is secured, the said tube is held against further rotation by lock nuts 37 and 38.

The ball 36 hereinbefore referred to, mounted in the cylinder 35 of the lever arm 25 is provided with a shank threaded into the upper end of a vertical member 39 whereby a ball and socket joint connection is obtained between the outer end of said lever arm 25 and the upper end of said vertical member 39.

On the opposite side of the chassis the construction is the same as that just described, the lever arm 30 being provided with a threaded tube 30' adjustably connecting the cylindrical end piece 40 carrying the ball joint 41 and the opposite end piece 31, said tube 30' being secured in adjusted position by the lock nuts 42 and 43 and the shank of the ball 41 being threaded into the upper end of its vertical member 44.

The axle section 7, forming the lower lever of the parallelogram, is rigidly secured to the torque arm 9 by bolts or the like 45 and 46 and moves in unison with it. The inner end of said axle section 7 terminates in a ball 47 which fits into a spherical bearing formed by a block and cap piece bolted together and secured to the bottom of cross member 3, rubber insulation being interposed between the bearing block and said frame member. The outer end of said axle section 7 is provided with a fork-like extension 7' to receive the lower end of the vertical member 39 of the parallelogram, said parts being pivotally secured together by a pivot pin, said pin being fixed against rotation in vertical member 39 by means of a cotter key, while the ends of said pin in the fork are mounted in needle bearings of a conventional type, said bearing then filled with grease and sealed In a similar manner the axle section 8 on the opposite side of the chassis is made fast to the torque arm 10 by bolts or the like 48 and 49, the inner end of said axle section 8 terminating in a ball 50 adapted to seat into the same type of spherical bearing secured to the bottom of the cross member 3, as described in connection with the ball 47 on the inner end of the axle section 7. Also like axle section 7, the outer end of axle section 8 is provided with a fork-like extension 8' to pivotally receive the lower end of its respective vertical member 44.

Formed integral with the vertical tie member 39 of the parallelogram, is an outwardly projecting boss 51 properly positioned with respect to the upper aand lower ends of said vertical member, the center line of said boss being at right angles to the longitudinal center line of the chassis. The spindle on which the road wheel 52 is mounted, is of the conventional roller bearing type and provided with an inwardly projecting forked end 53 and 53' embracing the outer end of the boss 51, said parts when assembled having aligned openings to receive the conventional king pin providing the necessary steering knuckle for the front wheels, it to be understood that on the opposite side of the chassis the arrangement of parts and construction is identical, the vertical member 44 being provided with a boss 54 pivoted to the forked ends 56 and 57 of the spindle carrying the other front wheel 55.

Mounted at the front end of the vehicle frame and transversely thereof, is a torsion bar or rod 57 said bar being secured to the side frame members 1' and 1 by rubber bushed bearings 58 and 59 held under pressure by cap pieces 60 and 61 respectively upon the tightening of bolts 62 and 63.

The outer ends of this torsion bar 57 are bent rearwardly and project in the same direction and plane, at right angles to the main intermediate portion of said bar 57, forming lever arms 64 and 65. The ends of these lever arms 64 anad 65 are flattened and drilled to receive studs 66 and 67 respectively. Secured to the projecting ends of each torque arm 9 and 10, are studs 68 and 69 respectively, said studs passing through bosses 70 in the underside of the torque arm and secured therein by nuts threaded on their inner ends. One of these bosses is shown at the left hand of Figure 2.

The outer ends of the studs 66, 67, 68 and 69 are ball headed and the balls of the studs 66 and 68 are connected by a tubular link 71 and the balls of studs 67 and 69 are similarly connected by a tubular link 72. Inside of each tubular link 71 and 72 there is provided proper spherical seats to complete the ball and socket joints, elongated openings being formed in said tubes to admit the studs 66, 68, 67 and 69 and to provide for adjustments by screw plugs threaded into the ends of the tubes 71 and 72.

The longitudinal center line of the chassis is represented by dotted line A, B, and the hinged axis of the lower levers of the parallelogram of the running gear is represented by the dotted line C, D, passing through the exact center of the ball joints 47 and 11, dotted line C, E, being the axis of said lower levers on the opposite side of the frame The dotted line F, G, is the axis of the pin joint connecting front axle section 7 with its vertical tie member 39 and dotted line H, I, is the axis of the pin joint connecting front axle section 8 with its vertical tie member 44. Dotted line J, K, is the axis of the pin joint at the inner end of lever 25 and dotted line L, M, is the axis of the pin joint at the inner end of lever 30.

The axes C, D, J, K, and F, G, must be parallel with each other and the axes C, E, L, M, and I, H, must be parallel to each other. The dotted line N, O, is parallel to C, D, and halfway between dotted lines C, D, and F, G, and dotted line P, Q, is parallel to C, E, and halfway between dotted lines C, E, and I, H.

Figure 2:
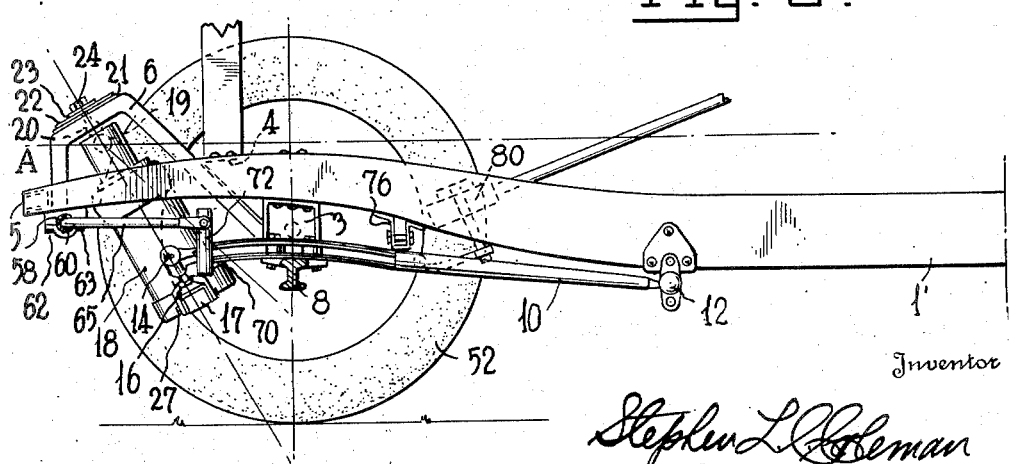

The steering gear linkage as illustrated in Figures 1 and 2 is of the divided type, comprising steering arms 73 and 74 bolted to the spindles of the respective wheels 52 and 55. Mounted transversely of the frame and secured to the side frame members 1 and 1', by clamping brackets 76, (Figure 2), is a square bar 75 having slidably mounted thereon a carriage 77. Connected to one end of this carriage by a flexible ball and socket joint is a tie rod 78, the opposite end of said tie rod being likewise connected to steering arm 73, and similarly connected to the other end of the carriage 77 and the steering arm 74, is a tie rod 79.

A conventional type of steering gear is shown, securely fastened to the side frame member 1', having a pitman arm 81 connected to one end of a drag link 82, the opposite end of said drag link being connected to an intermediate portion of the carriage 77, said connection being of the flexible ball and socket type.

The ball joint connecting carriage 77 to tie rod 78 is placed so that it is bisected in both planes by the hinge axis C, D, and likewise, on the opposite side of the chassis the ball joint connecting carriage 77 to the tie rod 79 is placed so that it is bisected in both planes by the hinge axis C, E.

At the rear end of the chassis the construction of the spring suspension and running gear is practically the same as that at the front end previously described herein in detail. The rear axle section 83 is bolted to the torque 84 and forms the lower lever arm of the parallelogram type running gear. The inner end of the axle 83 terminates in a ball 83' which is housed in a bearing at the bottom of the differential case, its outer end terminates in a fork through which it is pivotally connected to the lower end of the vertically disposed member 85. The intermediate portion of the vertical tie member 85 has secured thereto a hollow cylinder or spindle which extends on out at a reduced diameter and forms a hollow hub on which the road wheel 86 is mounted. The front end of the torque arm is flexibly connected to the side rail 1 of the frame by a ball joint 89. The upper lever 87 of the parallelogram has a fork on each end by which it is pivotally connected to the top of vertical tie member 85 and to the frame bracket 88, both of these joints being pin joints with rubber bushings.

The live axle 90 has a universal joint connection 91 at its inner end where it joins the differential, and another universal joint 92 at its outer end where it is connected to a stub shaft extending out from the universal joint 92 and passing through the hollow spindle of the vertical member 85 and bolted fast to the wheel 86 which it drives.

The construction on the opposite side of the chassis is identical to that just described and comprises an axle section 93 secured to the torque arm 94 and by a ball joint 93' at the inner end to said differential case. The vertically disposed tie member 95 carries the road wheel 96 and the ball joint 97 connects torque arm 94 to the frame. The upper lever 88 of the parallelogram at its inner end, is connected to the frame bracket 99 and at its outer end to the upper end of the vertical member 95 by a flexible joint 102. A torsion rod 103, of exactly the same construction as 57 on the front end of the chassis is provided with lever arms 104 and 105 and is mounted in rubber bushed bearings (one of which is shown at 106, Figure 2) on the side of the frame, the lever arms 104 and 105 being flexibly connected to the over-hanging ends of the torque arms 84 and 94 by tube links 107 and 108 by ball and socket joints in each end of the link tubes.

There are three cross members 109, 110 and 111 in the chassis frame and the hood piece 112 is fixed to 109 and 110 and transmits the load to the fluid pressure device 113 which is directly below it. The equalizing bar 114 which supports the spring device and 116 are the ball joint and pivot pin shackles which attach the equalizing bar 114 to the torque arms 84 and 94.

The differential case 117 has a novel form of rubber insulated mounting. At the top of the case 117 there is a transverse boss 118 integral with case 117, and near the front end of the neck of the differential case which houses the stub shaft of the drive pinion, there is a boss 119, this boss being bolted fast to case 117 by bolts 120. Passing through the drilled centers of these two bosses 118 and 119 are tubes 121 and 122 respectively, the ends of said tubes extending inside the flanges of the side frame members 1 and 1' and mounted in rubber bushed bearings, two of which can be seen in dotted outlines at 123 and 124. The differential case 117 is centered on the tubes 121 and 122 and secured against movement endwise of the tubes by set screws.

Figure 3 of the drawings is an end elevation of the front end of Figure 1 with the steering linkage and gear omitted where the parallelogram type running gear can be plainly seen. It is formed by the parallel levers 7 and 25 tied together at their outer ends by the upright member 39, and the assembly is braced in the fore and aft direction by torque arm 9. The running gear on the opposite side of the chassis is identical in construction. The torsion rod 57 with its bearings 58 and 59 at the frame, are plainly visible, as are the tie links 71 and 72 which connect the lever arms of the torsion rod to the overhanging ends of torque arms 9 and 10. The fluid pressure spring is shown at 18 with the equalizer bar 17 which supports it and 15 and 16 are the swinging shackles with pin joints at their tops which support the equalizing bar. The housings 13 and 14 are provided for the ball joints on the upper ends of shackles 15 and 16 and these housings are formed integral with the over-hanging ends of torque arms 9 and 10.

Referring to Figures 5 to 8 inclusive the improved fluid pressure shock absorbing spring device used in combination with the present vehicle suspension comprises an outer tube or cylinder 151 and an inner telescoping tube or cylinder 152.

Secured to the upper end of the tube 151 is a header block 153 provided with a semi-spherical seat 154 to receive a spherical member or ball 155 formed integrally with a shank 156, said shank having a tapered portion 157 and a reduced threaded end portion 158 to receive a nut or the like by means of which the upper end of the device is secured to the mass to be sprung. Through the longitudinal center of the ball 155 and the shank 156 there is a duct 159 provided with a grease gun fitting 160, whereby the necessary lubricant is supplied through the duct 159 to the load bearing surface of the ball and socket joint formed by the parts 154 and 155.

The header block 153 is primarily adjusted and secured in place within the tube 151, by set screws 161 and 162, and then finally welded around its top circumference as at 163 to make an air tight joint.

The ball 155 is held in position and adjusted to a proper working engagement by the annular member 164 threaded into the header 153 as shown. The top surface of the adjusting annular member 164 is provided with a series of spaced slots or grooves 165 and when said member 164 is properly adjusted it is locked against rotation relative to the block 153, by a keeper plate or key 166 secured to said block 153 by a set screw or the like 167, the free end of said key being in engagement with one of the slots 165.

Secured to the lower end of the inner tube 152, is a metal annular member or ring 168, tightly fitted around said tube and welded thereto as at 169.

Tightly fitted within the lower end of the tube 152 is a relatively short reinforcing tube section 170, the lower edge of said reinforcing tube and the lower edges of the ring 168 being in the same plane with the lower edge of the tube 152.

The upper edge of the reinforcing tube section 170 is constructed with an inwardly extending annular flange or head 171 provided with a series of spaced ports 172, and the lower edge of said tube section 170 is formed with an inwardly extending annular shoulder or flange 173.

Positioned within the tube 152 and concentric therewith is a smaller tube 174 provided with a piston 175, said tube 174 having its lower end threaded into the head 171 and locked therein by the cap-piece 176 also threaded onto the lower end of said tube 174. The upper or inner end of the tube 174 is provided with a welded in head or cap 177, through which operates with a sliding fit, a rod 178 for the piston 175, the upper end of said rod 178 terminating in an enlarged disk-like head 179 loosely fitting into a slot 180 formed on a boss 181 carried by the header block 153.

Mounted adjacent the lower end of the tube 174 is a disk valve 182, adapted to cooperate with the annular shoulder or flange 173 for controlling the size of this central port. This disk valve 182 is firmly secured to one end of a short rod or pin 183 passing with a sliding fit through a bearing in the center of the cap-piece 176, the opposite end of said pin 183 having secured thereto a disk head 184 having a sliding engagement within the lower end of the tube 174. A bleeder hole 185 is provided in the cap-piece 176 or bottom of tube 174 for the purpose to be hereinafter described.

The disk valve 182 is urged downwardly by a coil spring 186 and this downward movement and the size of the opening between the disk valve 182 and the annular member 173 is regulated and governed by an adjusting screw 187. This adjusting screw 187 is provided with a lock nut 188 and packing 189 and this outer end of the adjusting screw 187 is adapted to be enclosed and sealed within a cap nut 190.

These various parts just described in connection with the tube 174, comprise a dash pot tending to limit both extremes of the spring stroke.

Mounted between the telescoping tubes 151 and 152 is a ball bearing assembly comprising an annular cage 191 providing a retainer for a large number of balls 192, said assembly acting as an anti-frictional bearing between these telescoping members. The balls are preferably placed at close regular intervals in circles around the circumference of the retaining cage 191, the diameter of the holes in the cage being slightly larger than the diameter of the balls so as to permit true rolling thereof.

Disposed around the lower outside portion of the tube 152, and concentric therewith, is a coil spring 193 made of flat spring steel coiled on edge. The bottom or lower edge of this coil spring 193 is offset and turned up and said end is pivotally attached to tube 152 by a set screw or the like 194 and the upper end of said spring is similarly constructed and attached to the tube 151 by a set screw 195. The intermediate portion of the spring 193 has secured thereto a pin or stub shaft 196, said pin 196 being also secured to the lower end of a rod or link 197, the upper end of said link 197 terminating in a ball 198 loosely fitting into a hole and slot in the bottom edge of the ball cage 191.

Encircling the outer circumference of the tube 151, adjacent the lower end thereof, and securely fastened thereto, is an annular flange or ring 199, said ring being shaped to form a seat for an annular high pressure leather pump gasket 200 as shown. This gasket 200 is firmly secured against its seat 199, by a ring 201 which in turn is forced against the gasket 200 by a securing ring 202 threaded onto the lower outside end of tube 151. The upper inner annular face of the securing ring 202 is provided with a circumferential recess 203 in communication with bleeder ports 204 also formed in the ring 202 and the lower end of the tube 151. There is also provided in the upper end of the tube 152, a bleeder port 205.

Securely threaded on the upper end of the tube 152 is a ring 206 provided with an outside annular groove to receive a piston ring 207 which closes the opening between the top of said tube 152 and the inner wall of the tube 151 and at the same time properly centers the tube 152 under working condition and prevents the air under pressure in chamber C from flowing down between the walls of tubes 151 and 152, into chamber F which would nullify the restraining influence of disk valve 182.

Concentrically disposed about the telescoping tubes 151 and 152 is an outside tube or casing 208 said casing being spaced from the tube 151 and closely embracing the packing ring 200 hereinbefore referred to. The lower end of this casing 208 is provided with a solid bottom 209 preferably welded thereto.

The annular member or ring 168, secured to the bottom of the tube 152 has fixed thereon a series of studs 210 projecting downwardly and passing through the bottom member 209 of the outside tube 208 providing the means for securing together the bottom 209 and the ring 168, and also acting as an attaching means, whereby the bottom of the complete device is secured or mounted in operative position by nuts or the like 211, and positioned between the bottom member 209 and the ring 168, is a gasket 212 to prevent leakage around the studs 210.

Mounted in one side of the device, between the tube 151 and the outside casing or tube 208 is a fluid pump 213 the purpose of which is to be hereinafter more fully explained.

With particular reference to Figures 5-6 and 9, this pump assembly 213 comprises a plunger 214, the upper end of which being reduced and provided with a guide bearing 215 and a stop washer 216 to limit its upward travel. This piston 214 is normally held in its outward position by a flat, U-shaped spring 217 and raises said piston after each downward stroke. The guide bearing 215 is secured to the tube 151 by set screws as shown in Figure 5, and a stop member 218 is secured inside the top of the casing 208 by set screws or the like 219.

Cooperating with the piston 214 is a cylindrical bore 220 formed in the pump assembly and said assembly is also provided with a feed duct 221 fed by a port 222, said duct 221, at its upper end, being in communication with the cylinder 220 through port 223. This pump assembly is also formed with a valve chamber 224 provided with a lift valve 225 normally held down by a spring 226 to seal the opening at the bottom of chamber 224, and the upper end of the chamber 224 is closed by a plug or the like 227, which at the same time forms a backing for the spring 226. Connecting the chamber 224 with the cylinder 220 is a horizontal duct or passage 228.

Disposed between the cylinder 220 and the valve chamber 224 is an enlarged chamber 229, said chamber 229 being in communication with the valve chamber 224 through ports 230 and 231.

Between the pump assembly and the adjacent face of the tube 151 there is provided, in the exterior wall of said tube 151, a duct or passage 232, connecting chamber 229 with the recess 203 provided in the securing ring 202, which recess in turn being connected through ports 204 with the interior of the outside tube or casing 208 as hereinbefore described.

This pump assembly 213 is brazed or otherwise securely fastened to the outside face of tube 151 and bodily movable therewith during the operation of the device.

Extending upwardly from the upper end of the casing 208 is a flexible bellows 233, the upper end of said bellows being attached to a hollow metallic header or dome 234, surrounding and welded to the top of the tube 151, whereby all dust and dirt will be excluded from the chamber within the casing 208. Just below the header 234, the tube 151 is provided with an oil filler plug 235 and the header 234 is supplied with an air filler valve 236.

Connecting the interior of the tube 151 with the interior of the header 234 are ports 237 and 238 and at the lower end of the device ports 239 and 240 formed in the annular member or ring 168, tube 152 and tube section 170, connect the interior of the tube 208 with the interior of the tube 152. The dash-pot tube 174 is provided with a number of ports 241, 242, 243, 244, 245 and 246 to permit the passage therethrough of oil during the operation of the device.

To prepare the air spring for use it is fully telescoped, and plug 235 removed, and a charge of dewaxed oil is forced into the interior of the case until it reaches the level of the filler port which is then closed by replacing plug 235. Air under pressure is then applied through air valve 236 and the air spring is thereby extended raising the vehicle, where the device is used in connection with a vehicle spring suspension. When it reaches its normal height, which can be ascertained by measurement, the cap of valve 236 is replaced, and the spring is ready for use. Any air trapped at the top of chamber F below gasket 200 is vented through the small bleeder ports 204 and escapes through vent 205 into main air chamber C. A quantity of oil is then placed in atmospheric pressure chamber H to bring it up to the level of the dotted line B, B', and to provide an oil seal and keep the leather gasket 200 in good condition.

In action, when the sprung mass falls, or the wheels rise to pass over an obstruction, the air spring is telescoped, and some of the oil in chamber F is forced through ports 239 and 240 past disk valve 182 and past ports 172 into chamber E to rise above the dotted line A, A' and it further compresses the air in air chambers C and D, when this action has proceeded far enough to absorb the shock, the air gradually expands again to its original volume forcing the oil back past disk valve 182 and through the ports 239 and 240 into outside chamber F and the air spring returns to its original normal length.

In case of a very violent shock the disk valve 182 can rise and compress coil spring 186 thus giving a greater opening for the oil to pass through and acting as a safety device to prevent excessive shock. As soon as the oil stops flowing from outside chamber F into inside chamber E, coil spring 186 forces the disk valve down against adjusting screw 187 and the opening past the disk valve 182 is restricted. This controls the speed of the oil flow back from chamber E to F and consequently controls the speed of the rebound.

The amount of the set opening of disk valve 182 can be adjusted from the outside, through the removal of cap nut 190, the loosening of lock nut 188 and the turning of adjusting screw 187.

The chief advantage of the anti-friction ball bearing assembly here employed, consisting of retaining cage 191 and balls 192, is efficiency, simplicity and cheapness. The only precision measurement work required is on the inside of tube 151 and outside of tube 152. These surfaces would require hardening and grinding to make a suitable surface for the ball bearings to operate upon.

It is quite evident that the cage 191 acted upon by gravity, vibration and constant changing of the direction of pressure, would in time fall to the bottom of chamber F and be out of commission. To guard against this possibility and yet not interfere with true rolling of the balls in the bearing, the simple half movement device is employed, consisting of the coil spring 193 and drag link 197. If the top end of the coil spring moves a certain distance it is quite evident that the center of the length of the spring will move half as much in the same direction, therefore by tying one end of the coil spring to one telescoping tube, as at 195, and the other end to the other telescoping tube, as at 194, and tying the center of the coil spring, as at 196, by drag link 197 to retaining cage 191, then the retaining cage will always be in its proper position relative to the ends of its runway between tubes 151 and 152.

One advantage of an air spring is its relative softness at the first part of its compression stroke and it is essential, in order to preserve this advantage, to eliminate as much static friction as possible, so that the spring will start compressing without initial shock due to this friction. By employing a ball or roller bearing the greater part of friction is eliminated.

If the same volume of air is always retained in the air spring, the pressure will remain constant under the same load. In the air spring as illustrated in Figure 5, the air is not in contact with the leather gasket, there being an oil seal extending far above the top of the gasket. Any air which enters the oil through emulsification and rises to the leather gasket 200 will flow through ports 202 and rise between the walls of tube 151 and 152 until it reaches the abutment ring 206, it will then flow through port 205 back into the main air chamber C. Through this means air will be kept away from the leather gasket 200.

In course of time a certain amount of oil may, through seepage, work past the leather gasket 200 into the atmospheric pressure chamber H and join with the oil that is already in there to the height of dotted line B, B'. When enough leakage past gasket 200 takes place to raise the oil in chamber H so that it reaches the height of port 223 in the pump, Figure 6, it flows through port 223 and charges the pump cylinder 220, then when the telescoping cylinders of the air spring lengthen through rebound or other cause, the stop 218, fast to the inside top of outside cylinder 208, comes in contact with the washer 216 on pump piston 211 and forces it down. This forces the charge of oil out of pump cylinder 220, through duct 228, raises valve 225, discharges through port 231 into chamber 229, and from there it passes through duct 232 through ports 204 back where it came from in oil chamber F. The port 230 in the pump is for the purpose of letting the pressure in chamber 229, which is the same as that in oil chamber F, in on top of valve 225 to supplement the pressure of the coil spring 226 and keep valve 225 tight against possible leakage.

From the above it is apparent, that the volume of oil under pressure inside the air spring is maintained automatically. This being the case, the volume of air and its pressure, under normal load will not change, unless leakage develops in the air chambers which possibility is very remote.

The double acting shock absorber is of very simple construction. The resistance offered to the flow of oil past valve 182 on the compression stroke of the air spring, is governed by the amount of opening between the valve and its seat. The disk valve 182 being held down in contact wth adjusting screw 187 by the coil spring 186, the resistance offered by the oil passing through the restricted opening about valve 182 can be controlled by the rate of resistance to compression of the coil spring 186, which acts as a safety device to prevent the building up of too great a shock. The amount of the initial opening of the disk valve 182 can be adjusted from the outside by removing cap nut 190, loosening lock nut 188, allowing screw 187 to be turned to raise or lower disk valve 182 as desired.

On the expanding or rebound stroke of the air spring, the expanding air in chambers C and D forces oil out of chamber E down past valve 182, through ports 239 and 240 into chamber F thus restoring the air spring to the original length it had before the compression stroke. It is quite evident that the amount of opening between disk valve 182 and its seat 173 will restrict the speed of the flow of oil from chamber E to chamber F, and in so doing will govern the speed of rebound of the sprung mass.

The dash pot 174 with its piston 175 is to prevent metal to metal contact on either extreme of the air spring stroke. On the compression stroke the piston 175 approaches the bottom of the tube. On its way down it forces the oil out ahead of it through slots 244, 243, and 242 and 241. As slot after slot is passed the amount of opening for the escape of oil grows less so there is a progressive resistance. When finally the last slot is passed by the piston 175, the only escape for the oil is past the piston, and this being a neat fit a lot of resistance is set up thus bringing the parts to rest. When the piston passes port 241 there is a very heavy pressure exerted on the disk 204 which holds disk valve 182 down firmly against its adjusting screw 187 and this increases the resistance against bottoming by increasing the oil pressure in chamber F.

Referring to the drawing Figure 1, the narrow chassis with its straight side rails and short cross members, will be very stiff against weave and comparatively light. The only forces acting to twist the frame, are applied by the inner ends of the torque arms, at a point where the frame is deepest and is reinforced by the X shaped cross member 2, and such forces would be comparatively light.

The plane of suspension in this design is placed very high, being along the dotted line A, B, which passes in close proximity to the center of gravity of the sprung mass. This greatly reduces the overturning moment due to the inertia force on application of the brakes and also greatly reduces the rolling moment about the longitudinal axis due to centrifugal force when taking curves.

The running gear at both the front and rear end of the chassis is of the parallelogram type. The diagram as illustrated in Figure 10 of the drawings, shows how the swinging parallel levers guide the road wheel on its up and down travel.

The solid lines show the parts in their normal position, while the dotted lines show the extreme up and down positions. This particular layout is a compromise, giving a minimum of tread and camber change. By changing the ratio of length of the upper to the lower lever, different results can be secured. By maintaining a minimum of tread change tire wear will be decreased and the car will hold the road better. Referring to Figure 1, C, D, is the hinge line of the lower parallel lever while J, K, is the hinge line of the upper parallel lever, these hinge lines corresponding to the pivot points of the parallel levers shown in diagram Figure 4. The changing camber of the road wheels on one side of the chassis is in the opposite direction to that of the road wheels on the other side of the chassis and the gyroscopic effects on one wheel will be cancelled by those of its mate.

In this design all four wheels are independently sprung. The use of independently sprung wheels at the rear results in a very substantial reduction in unsprung weight and obviates the necessity in a low built car of having a tunnel running lengthwise through the floor to accommodate the drive shaft. Its use at the front end results in better handling qualities, due to the absence of wheel fight, shimmy and nose shake and the car will hold the road better at high speed.

Because the four torque arms carry the sprung load on a considerable overhang beyond the axles, their inner ends become support members carrying approximately 20% of the load, as the main load is passed onto the overhanging ends of the torque arms by equalizing bars, the reaction upward at their inner ends is equalized, and this has a material effect in maintaining the frame level.

In order to reduce the air spring stroke to one half the wheel stroke, the four outer overhanging ends of the torque arms are curved inward toward the center line of the chassis until the ball joints in their ends lie on the half way line between the hinge axis of the lower levers of the parallelogram and the axes of the pin joints at the outer ends of the lower levers. This is illustrated in Figure 1, where the half way line is N, O, the hinge axis is C, D, and the pin joint axis is F, G.

When the vehicle is moving ahead and the brakes are applied the reaction is transmitted through the pin joints at the outer ends of each axle or lever, along the length of each axle, tending to revolve the axles in the same direction as the wheels are turning. This creates a force acting upward at the inner ends of the front torque arms and creates a force acting downward at the inner ends of the rear torque arms. The four upper levers of the parallelogram in this design do not interfere with the creating of these reactionary forces in the several torque arms, because they are all free to move a certain amount in a fore and aft direction due to rubber bushings or ball joints. Likewise there is no resistance from the inner ends of the axles to revolution, because they are all ball joint connections. This upward reaction at the inner ends of the front torque arms will cancel the natural tendency of the front end of the car to bob down when the brakes are applied and at the rear end the downward reactions at the inner ends of the torque arms will cancel the natural tendency for the rear end of the car to rise.

The drive of the car is taken through the rear torque arms, and these being of considerable length there will be no rise or fall when accellerating the speed of the car.

Torsion rods are a very effective means to preserve equilibrium in a car, while at the same time they do not increase the rate of the spring suspension. Referring to Figure 3 of the drawings, if the frame falls or both wheels rise at once, there will be an up thrust by the links 71 and 72 on the two lever arms 64 and 65 and the torsion bar will turn freely in its bearings 58 and 59. If the side frame member 1 of the frame rolls down and the other side frame member 1' rises, there will be a force acting up through link 71 and a force pulling down through link 72, tending to twist the rod 57, which being made of spring steel resists this movement. If the side frame member 1 moves down one inch and rail side frame member 1' moves up one inch, the amount of twist would be equivalent to a two inch movement of one lever, and if the rate of resistanace of the rod to movement at the end of one of its levers was 125 pounds per inch, the resistance to a one inch roll as described would be 2×125 or 250 pounds.

Referring to diagram Figure 11: This diagram is a study of the forces and movements involved under side sway and roll. The diagram is a front elevation taken from Figure 3, modified for ease of illustration. The pivot A carries 80% of the load. The torque arms 9 and 10, Figure 1, carries the other 20% of the load due to the reaction caused by the overhung main load on the outer ends of the torque arms. The line A, B, represents the location of the fluid pressure spring unit. These springs can telescope but are rigid against movement in any other direction. The line C, D, represents a rigid equalizing bar, which supports the air spring and is rigidly attached thereto, the ends of the equalizing bar being flexibly connected to the running gear by swinging shackles. Centrifugal force acting on point A in the direction of the arrow, will move the line A, B, to A', B', and the other parts to the new locations shown by the dotted lines. It will be seen that in order to assume the new location that point B of the equalizing bar has to rise to B'. The load at point B is 2000 lbs. (note the actual load doubles because of the leverages) and the lever A', B' is to the lever B', D' as 2 is to 1 therefore it will take a force of 1000 pounds applied at A to raise the point B'. This effect is further emphasized by the fact that due to the overhang of the torque arms to which the swinging shackles are fastened, when the frame rolls down at E it carries the end of the torque arm fast to the frame with it and this raises point D' up, and when the frame rolls up at F it carries the end of the torque arm on that side with it, and lowers point C', thus adding materially to the resistance due to gravity already pointed out. The right hand corner of the frame at E has fallen one inch, while the left hand corner has risen one inch. Both of these movements will be augmented by a quarter of an inch due to the torque arm movement about the axles. The movement will be resisted by the torsion rod 57, Figure 3, with the net force at E of 125 pounds per inch of travel and a corresponding amount at F. This gives a restoring force of gravity of 1000 pounds. Torsion bar 1¼×125×2 equals 312 pounds. Total 1312 pounds per the first inch of roll. There is a similar condition at the other end of the chassis, so that the grand total is 2×1312 or 2624 pounds.

Resistance to rolling at the front and rear of the car being equal, this promotes equilibrium, because the resistance at the rear end opposes the thrust from the front end with an equal force, when the front wheels are passing over a lateral inclination in the road, and vice versa.

To make use of a fluid pressure spring successfully without employing a large volume of air which entails the use of auxiliary reservoirs, the stroke of the spring must be comparatively short. The object is accomplished in this design by placing the ball joints of the swinging shackles half way between the hinge axes of the axles and the axes of the pin joints at the outer ends of the axles. This is illustrated in Figure 1, where 13 is the housing of the ball joint of one of the swinging shackles, which is bisected by the line N, O, laying halfway between and parallel with the hinge axes C, D, and F, G. With this layout a three inch compression of the spring allows a six inch wheel stroke.

The fluid pressure spring has a rapidly progressive rate of resistance and this fact permits the use of a very low rate of resistance on the first part of the spring stroke without danger of hitting through on bad bumps, because the spring rate builds up on the last part of the spring stroke. This is an ideal condition for securing a better ride on pavements.

The progressive rate of the fluid pressure spring is prevented from becoming too harsh by mounting the said springs at an angle to the vertical plane, so that the angle increases under spring stroke, this creates an effect similar to that of a toggle joint, and progressively increases the load on the spring as the stroke progresses thus mitigating the effect of the build up in the said spring.

The idea of relieving the suspension springs of all functions except those of supporting the load and resisting roll has gained ground. This design goes even a step further, by separating the function of preventing roll from the springs, and confining their work to the one function of springing the load. This permits the greatest possible softening of the suspension springs without lessening stability.

The front and rear springs are given the same rate of deflection, which prevents fore and aft pitching of the vehicle.

Each fluid pressure spring contains a built in hydraulic shock absorber and rebound check and there is a very considerable reduction in weight because two such springs replace approximately 130 pounds of steel springs and about 35 pounds of shock absorbers.

The chassis frame is hung like a hammock, 80% of the load being carried on the ball joints on top of the said springs, one at each end of the chassis. This pivotal supporting of the sprung load, prevents any twisting stresses being transmitted to the frame and body through the springs. It also eliminates a lot of shock and vibration. These pivotal connections of the springs to the chassis frame has another important effect in that the resistance to one wheel rise from the suspension spring is 50% less than it is when both wheels are raised at once, due to the compound lever between the wheel and the spring.

Referring to the drawings diagram 12. This diagram is taken from Figure 3, the parts being modified for ease of illustration. Let it be assumed that the air spring has the following characteristics:

Volume of air 100 cubic inches.
Area of piston 20 square inches.
Initial load 3120 pounds.

If the wheels D and I are raised one inch, point B and G will rise ½ inch and ½ inch compression of the fluid pressure spring (by the laws of pneumatics) equal $100 \times 3120$ divided by 90 equals 3466 and 3466 minus 3120 equals 346 pounds, representing the spring resistance to be overcome at E. This creates a load at B and G of 346 divided by 2 or 173 pounds. Then by the law of the lever, Power $\times$ Power arm equals weight $\times$ weight arm
$P \times 25$ equals $173 \times 10$
$P \times 25$ equals 1730
P equals 69 pounds.

Then the resistance from the spring, if both wheels are raised at once is 69 pounds at each wheel for the first inch of wheel rise.

If one wheel, say D is raised one inch, point C will rise one inch, then point B will rise ½ inch, and point E will rise ¼ inch. This will compress the spring ¼ inch and the resistance at E will be:

$$\frac{100 \times 3120}{90} = 3284$$

$3284 - 3120 = 164$ pounds.

Then the load at point B will be 164 divided by 2 or 82 pounds. By the law of the lever, Power $\times$ Power arm equals weight $\times$ weight arm
$P \times 25$ equals $82 \times 10$.
$P \times 25$ equals 820.
P equals 33 pounds.

Then the resistance against one wheel rise from the suspension spring is 33 pounds at the wheel for the first inch of rise.

There will also be resistance from the torsion rod against one wheel rise. Assuming that the rate of resistance of the torsion rod for each inch of movement at the end of one of its lever arms, the other lever arm being held against movement, is 125 pounds and point B is where the torsion rod is connected to the running gear. If wheel D rises one inch, point C rises one inch and point B rises one half inch. One half of 125 equals 62½ pounds, say 63 pounds, then by the law of the lever $10 \times 63$ divided by 25 equals 25⅕ say 25 pounds. Then the resistance of the torsion rod is 25 pounds per inch of one wheel rise. We then have a total resistance at the wheel, if only one wheel at a time is raised, of 33 pounds from the fluid pressure spring and 25 pounds from the torsion rod making a total of 58 pounds.

Most of the joints in this design are rubber bushed which eliminates the necessity of lubrication, and there is not a single point of metal to metal contact between the running gear and frame.

The rubber insulated mounting for the differential case employed in this design is particularly effective to provide softness and yet not permit the case to have much movement. The rubber bushings being placed at the side rails of the frame, great leverage is secured to hold the case in place.

The chassis is low hung and yet has ample ground clearance. The steering linkage gives perfect geometry, because the front axles and steering tie rods are turning on the same axes and the cost would be nominal.

It is to be understood that the invention is not limited to the specific types of fluid pressure spring, equalizing bars, stabilizers, running gear, steering linkage, ball shackles or rubber joints, or to the exact combination and arrangement of these parts as shown, as obviously other arrangements or devices can be used to accomplish the same result. It would be practical to substitute a telescoping shock absorber surrounded by a coil spring for the fluid pressure spring if desired. Further, although it is preferable to instal the suspension on both ends of a vehicle, yet it would work if installed at one end only, with a conventional spring design at the other. This type of spring suspension could be readily adapted for use on those types of car which have the frame built into the body.

I claim:

1. In a vehicle suspension, the combination with a frame, of a running gear including an axle divided into sections, an expansible and contractible spring device for said axle mounted at the central longitudinal axis of the frame, pivotal connections between said axle sections and frame, a radius rod for each axle section, said radius rods having their inner ends pivotally connected to the frame, their intermediate portions connected to the axle sections and their outer ends supporting said spring device, and a torsion rod mounted at the end of the frame outside of said spring device, the ends of said torsion rod being pivotally connected to the outer ends of said radius rods adjacent their points of attachment to the spring device.

2. A vehicle suspension as claimed in claim 1 in which universal joint connections are used between the axle sections and frame and the spring device is fluid pressure type and is flexibly connected at its upper end to the frame, a transverse member for supporting the lower end of said spring device, the outer ends of the radius rods being pivotally connected to said transverse member and the torsion rod being connected to the outer ends of the radius rods adjacent their points of attachment to the transverse member.

3. A vehicle suspension as claimed in claim 1 in which the spring device is mounted at an angle to the vertical.

4. In a vehicle suspension adaptable to either the front or rear, or both ends of the vehicle, the combination with a frame, of a running gear including an axle divided into sections, an expansible and contractible spring device mounted at the central longitudinal axis of the frame adjacent said divided axle, a rigid cross member supporting at its intermediate portion said spring device, a radius rod for each axle section, said radius rods having their inner ends pivotally connected to the frame, the axle sections being rigidly secured to their respective radius rods intermediate the ends of said radius rods, means for pivotally supporting the said cross member on the outer ends of said radius rods, and a torsion rod pivotally mounted on the frame between the end of said frame and said rigid cross member, the ends of said torsion rod being connected to the radius rods outside of the sides of the frame and between the axle and the outer ends of the radius rods at points adjacent their points of attachment to said cross member.

5. In a vehicle suspension as claimed in claim 4 in which the inner ends of the axle sections are pivotally connected to the frame and the outer ends of said axle sections are pivotally connected to the lower ends of vertical wheel carrying members, each wheel carrying member being provided with a tie member having one end pivotally connected to the upper end of its respective vertical member and the other end pivotally connected to the frame.

6. In a vehicle suspension as claimed in claim 4 in which the rotatable axes of all the pivotal points of the axle sections, radius rods, tie rods and wheel carrying members on the opposite sides of the frame are parallel to each other and at an angle of not less than 10° to the longitudinal axis of the frame.

STEPHEN L. C. COLEMAN.